United States Patent
Tahara et al.

(10) Patent No.: US 10,119,513 B2
(45) Date of Patent: Nov. 6, 2018

(54) POWER SUPPLY SYSTEM

(71) Applicant: NISSAN MOTOR CO., LTD., Kanagawa (JP)

(72) Inventors: Masahiko Tahara, Kanagawa (JP); Atsushi Tezuka, Kanagawa (JP); Tomoyuki Koike, Kanagawa (JP); Munemitsu Watanabe, Kanagawa (JP); Akifumi Koishi, Kanagawa (JP); Terumasa Tsuchiya, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/573,728

(22) PCT Filed: May 12, 2015

(86) PCT No.: PCT/JP2015/063623
§ 371 (c)(1),
(2) Date: Nov. 13, 2017

(87) PCT Pub. No.: WO2016/181495
PCT Pub. Date: Nov. 17, 2016

(65) Prior Publication Data
US 2018/0126856 A1    May 10, 2018

(51) Int. Cl.
*B60L 1/00* (2006.01)
*B60L 3/00* (2006.01)
(Continued)

(52) U.S. Cl.
CPC ............ *F02N 11/0814* (2013.01); *B60L 7/10* (2013.01); *B60L 11/14* (2013.01); *B60L 11/18* (2013.01);
(Continued)

(58) Field of Classification Search
CPC ........... F02N 11/0814; F02N 11/08866; B60R 16/023; H02J 7/14; H02J 7/1423; B60L 11/18
See application file for complete search history.

(56) References Cited

U.S. PATENT DOCUMENTS

2006/0097577 A1*  5/2006  Kato .................... F02N 11/0866
                                                                307/10.1
2011/0260544 A1* 10/2011  Imai ...................... H02J 7/1423
                                                                 307/66
(Continued)

FOREIGN PATENT DOCUMENTS

JP    2004-222473 A     8/2004
JP    2004-328988 A    11/2004
(Continued)

OTHER PUBLICATIONS

English translation of International Preliminary Report on Patentability issued in PCT/JP2015/063623, dated Nov. 16, 2017 (5 pages).
(Continued)

*Primary Examiner* — Rexford Barnie
*Assistant Examiner* — Rasem Mourad
(74) *Attorney, Agent, or Firm* — Osha Liang LLP

(57) ABSTRACT

A power supply system in a vehicle having an idling stop function for executing an automatic stop and an automatic restart on an engine has a power generator, a first storage unit that can be charged with and can discharge generated power generated by the power generator, a second storage unit that can be charged with and can discharge the generated power, two paths connecting the first storage unit and the second storage unit, a switching unit including a first switch for switching one path of the two paths between a conductive condition and a non-conductive condition, and a second switch for switching another path of the two paths
(Continued)

between a conductive condition and a non-conductive condition, and an engine restarter connected to either the first storage unit side or the second storage unit side of the switching unit in order to start the engine during the automatic restart.

3 Claims, 8 Drawing Sheets

(51) Int. Cl.
| | | |
|---|---|---|
| *H02G 3/00* | (2006.01) | |
| *F02N 11/08* | (2006.01) | |
| *B60L 11/14* | (2006.01) | |
| *B60L 11/18* | (2006.01) | |
| *B60R 16/033* | (2006.01) | |
| *H02J 7/14* | (2006.01) | |
| *B60L 7/10* | (2006.01) | |
| *B60R 16/023* | (2006.01) | |
| *B60R 16/03* | (2006.01) | |

(52) U.S. Cl.
CPC .......... *B60R 16/023* (2013.01); *B60R 16/033* (2013.01); *B60R 16/0307* (2013.01); *H02J 7/14* (2013.01); *F02N 11/0866* (2013.01); *F02N 2200/063* (2013.01); *F02N 2250/02* (2013.01); *Y02T 10/7005* (2013.01); *Y02T 10/7077* (2013.01)

(56) References Cited

U.S. PATENT DOCUMENTS

| | | | |
|---|---|---|---|
| 2012/0296506 A1* | 11/2012 | Kotani | ...................... H02J 1/00 701/22 |
| 2014/0015534 A1* | 1/2014 | Katayama | ............. H02J 7/0077 324/430 |
| 2014/0091767 A1 | 4/2014 | Tamura et al. | |
| 2015/0210271 A1* | 7/2015 | Yamazaki | ............... F02N 11/04 701/22 |
| 2016/0257270 A1* | 9/2016 | Teramoto | ............ B60L 11/1868 |

FOREIGN PATENT DOCUMENTS

| | | |
|---|---|---|
| JP | 2009-108733 A | 5/2009 |
| JP | 2011-234479 A | 11/2011 |
| JP | 2013-119331 A | 6/2013 |

OTHER PUBLICATIONS

International Search Report issued in PCT/JP2015/063623 dated Jul. 14, 2015 (3 pages).
Written Opinion of the International Searching Authority issued in PCT/JP2015/063623 dated Jul. 14, 2015 (4 pages).
International Preliminary Report on Patentability from PCT/JP2015/063623 dated Dec. 7, 2015 (9 pages).

* cited by examiner

POWER SUPPLY SYSTEM

BACKGROUND

Technical Field

The present invention relates to a power supply system for a vehicle having two secondary batteries.

Related Art

JP2011-234479A discloses a power supply system for a vehicle that includes a lead acid battery and a lithium ion secondary battery. In this power supply system, when an engine is restarted automatically following an idling stop, a power supply voltage of the vehicle decreases momentarily due to a large current flowing through a starter motor, and therefore, to protect a part of a vehicle electrical load provided on the lithium ion secondary battery side, electrical conduction between the lithium ion secondary battery and the starter motor is cut off so that power is supplied to the starter motor from the lead acid battery alone.

SUMMARY OF INVENTION

In the configuration of the above document, the lead acid battery, which is discharged during a starting stage of an automatic engine restart, is charged during an operation following the automatic engine restart. However, a lead acid battery typically exhibits lower durability with respect to repeated charging and discharging than a high-performance storage battery such as a lithium ion secondary battery or a nickel hydrogen battery. Therefore, with the configuration of the above document, in which the lead acid battery is charged and discharged every time the engine is automatically restarted following an idling stop, deterioration of the lead acid battery advances even when a specialized high-performance lead acid battery for idling stops is used.

One or more embodiments of the present invention provides a power supply system with which deterioration of storage means such as a lead acid battery can be suppressed.

According to one or more embodiments of the present invention, a power supply system applied to a vehicle having an idling stop function for executing an automatic stop and an automatic restart on an engine is provided. The power supply system includes a power generator, a first storage unit that can be charged with and can discharge generated power generated by the power generator, a second storage unit that can be charged with and can discharge the generated power, two paths connecting the first storage unit and the second storage unit; a switching unit including a first switch for switching one of the paths between a conductive condition and a non-conductive condition, and a second switch for switching the other path between a conductive condition and a non-conductive condition, an engine restarting unit connected to either the first storage unit side or the second storage unit side of the switching unit in order to start the engine during the automatic restart, an electrical load of the vehicle, which is connected to the first storage unit side of the switching unit, and a control unit configured to implement ON/OFF control on the first switch and the second switch. Further, the control unit switches both the first switch and the second switch to the conductive condition while the engine is operative, except during a starting stage of the automatic restart, and during the idling stop.

DETAILED DESCRIPTION

Embodiments of the present invention will be described below with reference to the attached figures. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
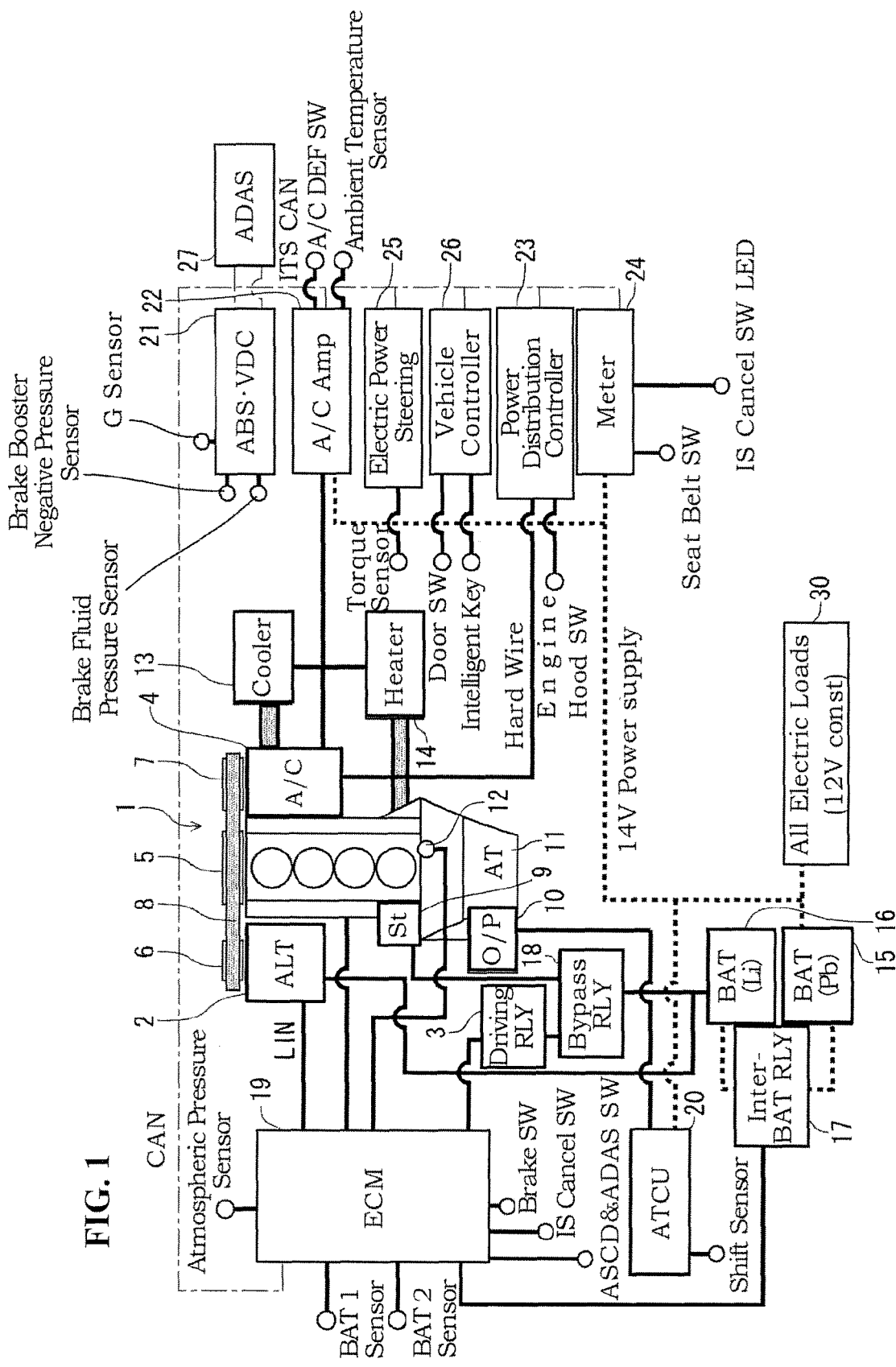
FIG. 1 is a schematic view showing an engine system according to one or more embodiments of the present invention.

FIG. 1 is a schematic view of a system for an engine having an idling stop function according to one or more embodiments of the present invention.

As shown in FIG. 1, an engine 1 includes a power generator 2 and an air conditioner compressor 4, the power generator 2 and the air conditioner compressor 4 being provided respectively on one side face and another side face of the engine 1 via brackets or the like, not shown in the figure. A belt 8 is wound around a crank pulley 5 mounted on a tip end of a crankshaft of the engine 1, a power generator pulley 6 mounted on a tip end of a rotary shaft of the power generator 2, and a compressor pulley 7 mounted on a tip end of a rotary shaft of the air conditioner compressor 4, whereby the respectively pulleys 5, 6, 7 are mechanically coupled to each other.

It should be noted that in FIG. 1, three pulleys, namely the crank pulley 5, the power generator pulley 6, and the compressor pulley 7, are mechanically coupled to each other by the single belt 8, but instead, the power generator pulley 6 and the compressor pulley 7 may be coupled respectively to the crank pulley 5 by different belts 8. Moreover, chains may be used instead of belts.

The engine 1 includes a starter 9 provided in the vicinity of a coupling portion coupled to an automatic transmission 11. The starter 9 includes a pinion gear that advances and retreats in a similar manner to a typical starting starter. When the starter 9 is activated, the pinion gear engages with a gear provided on an outer periphery of a drive plate that is mounted on a base end portion of the crankshaft, and as a result, cranking is performed. Power supply to the starter 9 will be described below.

The automatic transmission 11 includes an electric oil pump 10 for securing control oil pressure during an idling stop. The electric oil pump 10 is activated in response to a command from an automatic transmission controller 20 in order to improve responsiveness during vehicle departure following an idling stop.

The power generator 2 generates power when driven by driving force from the engine 1, and during power generation, a generated voltage can be controlled variably by LIN (Local Interconnect Network) communication or hard-wire. The power generator 2 is also capable of regenerating kinetic energy produced by the vehicle as electric power when the vehicle decelerates. Power generation and regeneration are controlled by an engine control module (referred to hereafter as an ECM) 19.

The ECM 19 reads detection signals from various sensors, such as a crank angle sensor 12, a battery sensor, and an atmospheric pressure sensor, and signals from various switches, such as a brake switch, and controls a fuel injection amount, an ignition timing, and so on, as well as executing idling stop control. Further, the ECM 19 implements intercommunication between an ABS/VDC unit 21, an air conditioner amplifier 22, an electric power steering unit 25, a vehicle control controller 26, a power supply distribution controller 23, a meter unit 24, and a driver assistance system (ADAS) unit 27 via a CAN (Controller Area Network) in order to implement optimum control on the vehicle.

The ECM 19 is constituted by a microcomputer having a central processing unit (CPU), a read-only memory (ROM), a random access memory (RAM), and an input/output interface (I/O interface). The ECM 19 may also be constituted by a plurality of microcomputers.

The system shown in FIG. 1 includes two secondary batteries, namely a lead storage battery serving as a first storage unit and a non-aqueous electrolyte secondary battery serving as a second storage unit. It is assumed hereafter that the lead storage battery is a lead acid battery 15 and the non-aqueous electrolyte secondary battery is a lithium ion secondary battery 16. It should be noted that an open-circuit voltage of the lead acid battery 15 in a fully charged state is 12.7 V, and an open-circuit voltage of the lithium ion secondary battery 16 in a fully charged state is 13.1 V.

As will be described below, the lead acid battery 15 and the lithium ion secondary battery 16 are connected to each other in parallel via two paths C1, C2, while a MOSFET 50 and a lead acid battery path relay 51 that together function as switching unit are each connected to one of the two paths.

The lead acid battery 15 supplies power to an overall electrical load 30. In this system in particular, the lead acid battery path relay 51 is switched OFF (to a non-conductive condition) at a starting stage of an automatic engine restart following an idling stop to prevent a momentary voltage decrease (also referred to hereafter as a voltage drop), which occurs when the starter 9 is driven, from having an effect. As a result, an operating voltage of the overall electrical load 30 is secured.

Power generated by the power generator 2 (including power generated by regeneration; likewise hereafter) is charged to both the lead acid battery 15 and the lithium ion secondary battery 16.

It should be noted that when power is supplied to the overall electrical load 30 from the lead acid battery 15 and the lithium ion secondary battery 16 and when the power generated by the power generator 2 is charged to the lead acid battery 15 and the lithium ion secondary battery 16, voltage regulation is performed by implementing field current control on the power generator 2.

Further, in the system described above, typical idling stop control is executed. More specifically, when various conditions are satisfied, for example when an accelerator pedal is fully closed, a brake pedal is depressed, a vehicle speed is no higher than a predetermined vehicle speed, and so on, the engine 1 is automatically stopped, and when a depression amount of the brake pedal falls to or below a predetermined amount, the engine 1 is automatically restarted.

Figure 2:
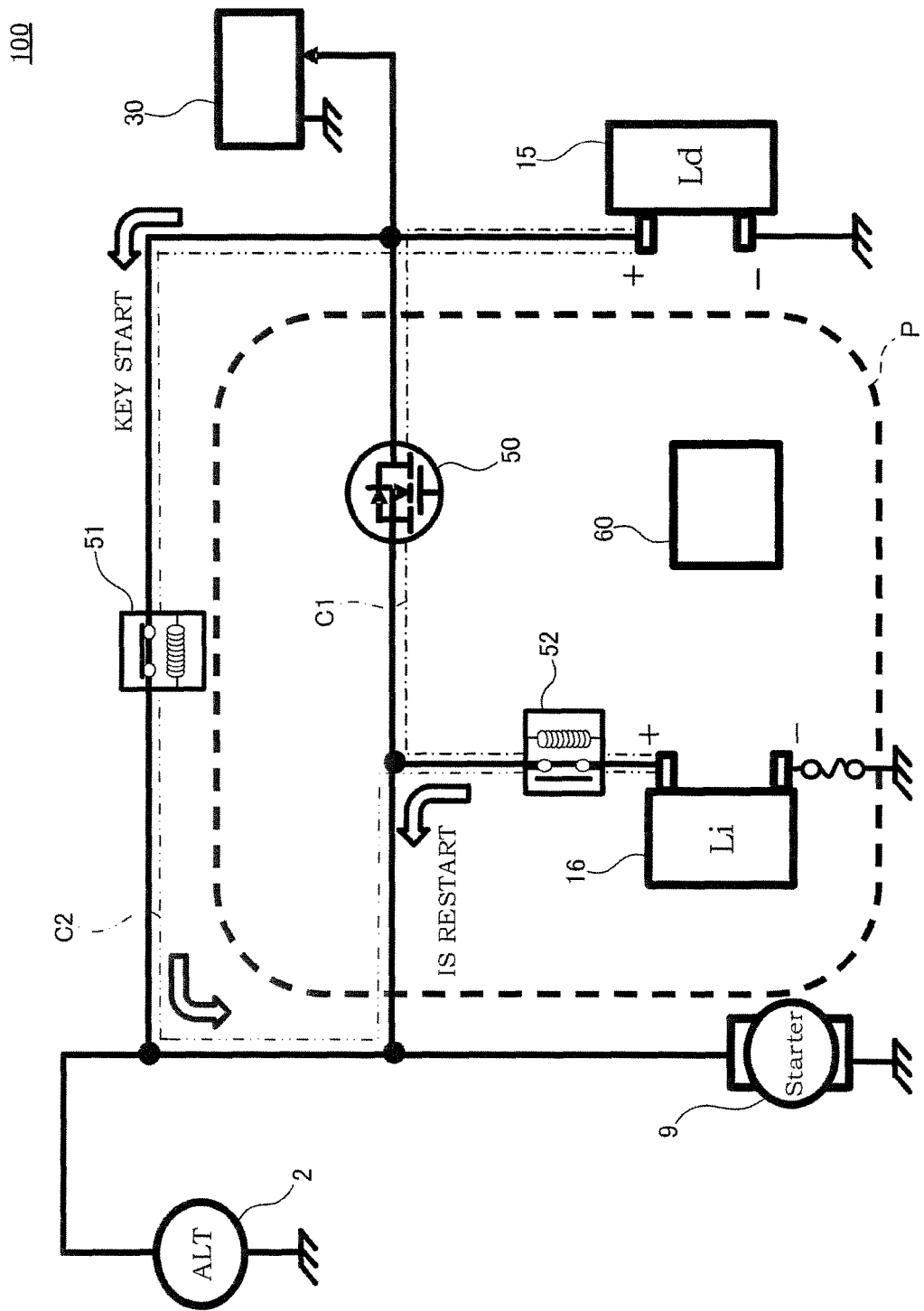
FIG. 2 is a view illustrating a configuration of a first power supply system.

FIG. 2 is a view illustrating a first configuration (also referred to hereafter as a type 1 power supply system) of a power supply system for supplying power to the starter 9 and the electrical load 30.

As shown in FIG. 2, in a power supply system 100 according to one or more embodiments of the present invention, the lead acid battery 15 and the lithium ion secondary battery 16 are connected to each other in parallel by the two paths C1 and C2. The lead acid battery path relay 51 is connected to one of the paths, namely the path C2, as a first switch for switching the path C2 between a conductive condition and a non-conductive condition. Further, the MOSFET 50 is connected to the other path, namely the path C1, as a second switch for switching the path C1 between a conductive condition and a non-conductive condition. The lead acid battery path relay 51 and the MOSFET 50 together constitute switching unit.

In other words, the lead acid battery path relay 51 is disposed on the path C2 that extends from the lithium ion secondary battery 16 to the lead acid battery 15, while the MOSFET 50 is disposed on the path C1 that extends from the lithium ion secondary battery 16 to the lead acid battery 15.

The MOSFET 50 is connected such that a forward direction of a parasitic diode thereof matches a direction heading from the lithium ion secondary battery 16 side toward the lead acid battery 15 side. As a result, electrical conduction from the lead acid battery 15 to the lithium ion secondary battery 16 on the path C1 is prevented regardless of the ON/OFF condition of the MOSFET 50. Further, a so-called normally closed type relay, which remains in an ON condition (a conductive condition) when a coil thereof is not energized, is used as the lead acid battery path relay 51. It should be noted that a momentary maximum current capacity of the MOSFET 50 is 180 A, for example, and a momentary maximum current capacity of the lead acid battery path relay 51 is 1200 A, for example.

Furthermore, a lithium ion secondary battery-attached relay 52 is connected in series to the lithium ion secondary battery 16. The lithium ion secondary battery-attached relay 52 is constituted by a so-called normally open type relay, which remains in an OFF condition (a non-conductive condition) when a coil thereof is not energized. Here, the momentary maximum current capacity of the lithium ion secondary battery-attached relay 52 is 800 A, for example.

In one or more embodiments of the present invention, the lithium ion secondary battery 16, the lithium ion secondary battery-attached relay 52, the MOSFET 50, and a batter controller 60 are packaged together to form a lithium battery pack P. Here, the battery controller 60 receives a signal relating to a discharge command or a charge command applied to the starter 9 or the overall electrical load 30 in accordance with operating conditions of the engine 1 from the ECM 19, and executes ON/OFF control on the lithium ion secondary battery-attached relay 52 and the MOSFET 50 on the basis of this signal.

In the type 1 power supply system 100, the overall electrical load 30 is connected to the lead acid battery 15 side of the lead acid battery path relay 51. The starter 9 and the power generator 2 are connected to the lithium ion secondary battery 16 side of the lead acid battery path relay 51.

Figure 3:
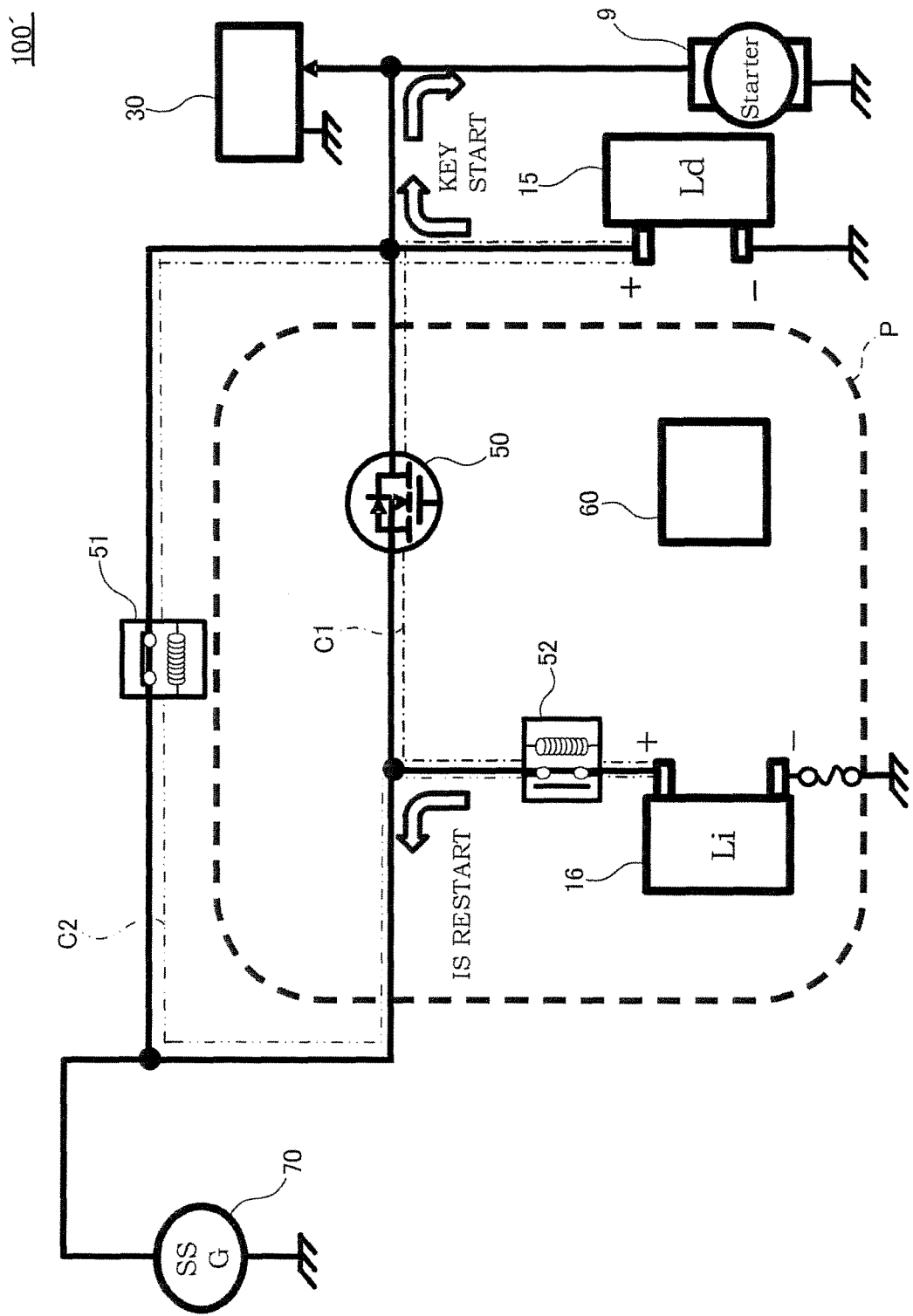
FIG. 3 is a view illustrating a configuration of a second power supply system.

FIG. 3 is a view illustrating a second configuration (also referred to hereafter as a type 2 power supply system) of a power supply system for supplying power to the starter 9 and the electrical load 30. It should be noted that identical reference symbols have been allocated to elements that are similar to the respective elements shown in FIG. 2.

A type 2 power supply system 100' differs from the type 1 power supply system 100 shown in FIG. 2 in that a motor 70 is used instead of the power generator 2, and the starter 9 is connected to the lead acid battery 15 side of the lead acid battery path relay 51. The motor 70 includes a pulley that corresponds to the power generator pulley 6, and the pulley is mechanically coupled to the crank pulley 5 by a belt or the like.

The motor 70 includes an inverter, and functions as a motor when driven by power supplied from the lithium ion secondary battery 16, and as a power generator that generates power when driven by driving force from the engine 1. Further, when the power generation function of the motor 70 is used, a generated voltage can be controlled variably.

The ECM 19 switches between the motor function and the power generation function. The motor function is used mainly at the starting stage of an automatic engine restart following an idling stop. In other words, in the type 2 power supply system 100', the motor 70 serves as engine restarting unit. It should be noted that the starter 9 is used only during an initial start (a start other than an automatic restart). A starter having identical specifications to a starter of a vehicle not having an idling stop function may be used as the starter 9.

Further, according to the type 2 power supply system 100', the lead acid battery 15 and the starter 9 are provided on the same side of the lead acid battery path relay 51, and therefore a current does not flow through the lead acid battery path relay 51 when power is supplied to the starter 9 from the lead acid battery 15 during an initial start of the engine 1.

In other words, when setting the momentary maximum current capacity of the lead acid battery path relay 51, it is not necessary to take into account a large current for driving the starter 9 during an initial start of the engine 1. Therefore, the current capacity of the lead acid battery path relay 51 can be reduced in comparison with that of the lead acid battery path relay 51 used in the type 1 power supply system 100, enabling a reduction in the construction cost of the lead acid battery path relay 51.

Figure 4:
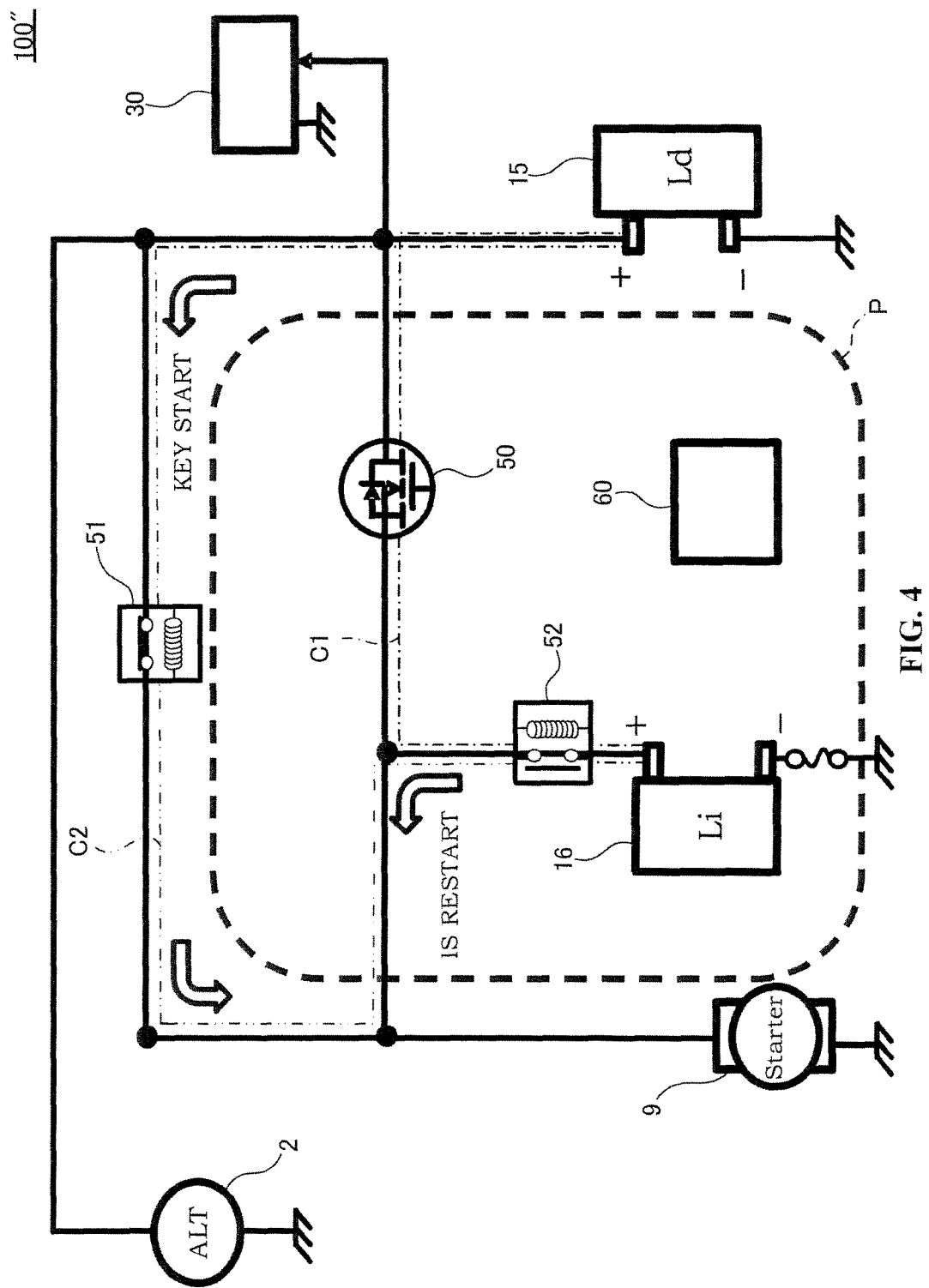
FIG. 4 is a view illustrating a configuration of a third power supply system.

FIG. 4 is a view illustrating a third configuration (also referred to hereafter as a type 3 power supply system) of a power supply system for supplying power to the starter 9 and the electrical load 30. A type 2 power supply system 100" differs from the type 1 power supply system 100 shown in FIG. 2 in that the power generator 2 is connected to the lead acid battery 15 side of the lead acid battery path relay 51.

ON/OFF control executed on the lead acid battery path relay 51, the lithium ion secondary battery-attached relay 52, and the MOSFET 50 in the respective power supply systems of type 1 to type 3 in accordance with a starting condition of the engine will now be described.

Reference Example

Figure 8:
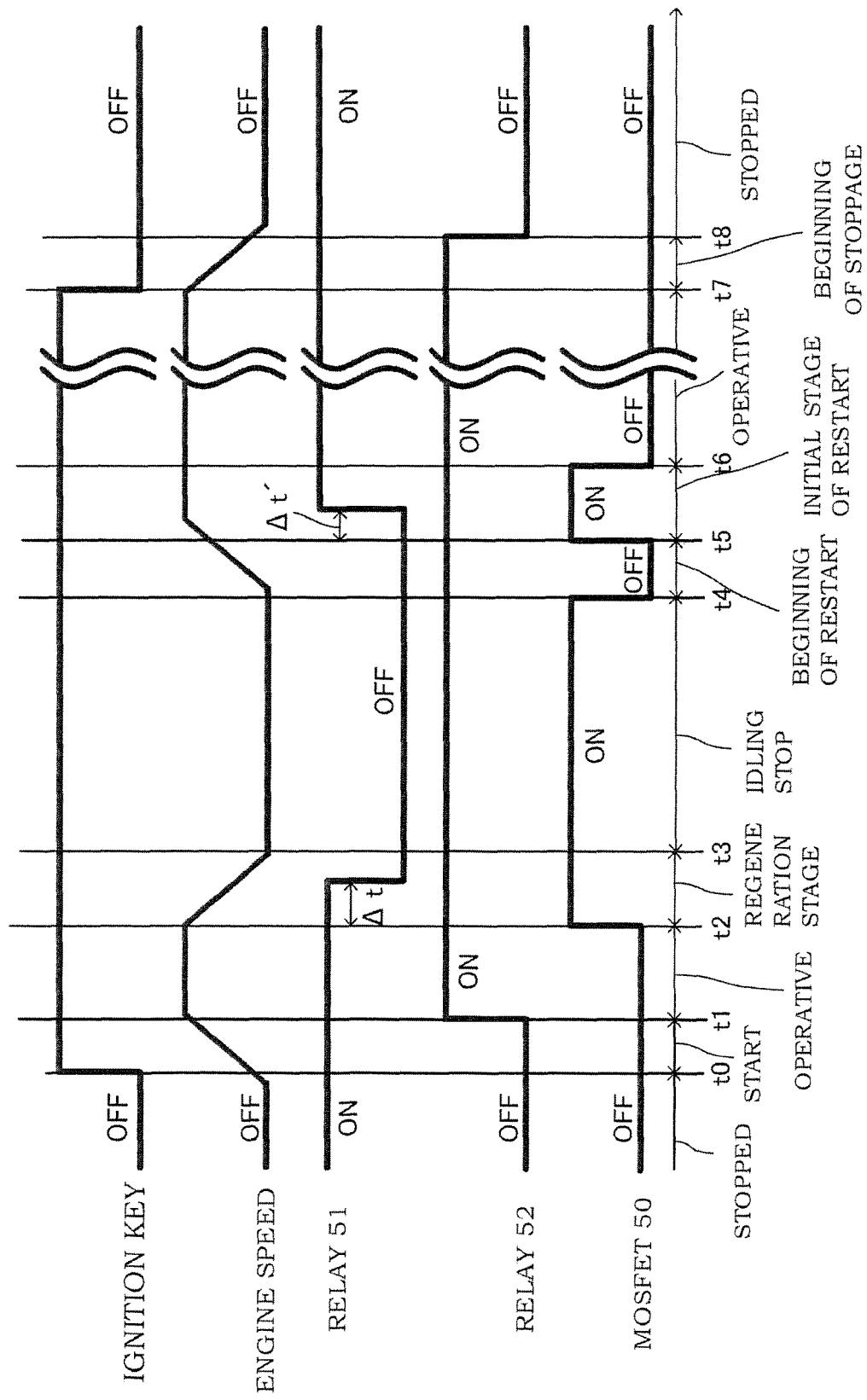
FIG. 8 is a time chart illustrating switching control according to a reference example.

FIG. 8 is a time chart illustrating ON/OFF control implemented on the lead acid battery path relay 51, the lithium ion secondary battery-attached relay 52, and the MOSFET 50 according to a reference example. This figure shows respective ON/OFF conditions of the lead acid battery path relay 51, the lithium ion secondary battery-attached relay 52, and the MOSFET 50 over time in accordance with the ON/OFF condition of an ignition key (not shown) and the magnitude of the engine speed.

It should be noted that hereafter, when the lead acid battery path relay 51, the lithium ion secondary battery-attached relay 52, and the MOSFET 50 are ON, this means that the respective components are conductive, and when the lead acid battery path relay 51, the lithium ion secondary battery-attached relay 52, and the MOSFET 50 are OFF, this means that the respective components are non-conductive. Further, it is assumed in the following description that the time chart shown in FIG. 8 is applied to the configuration of the power supply system 100 shown in FIG. 2, but the time chart shown in FIG. 8 may be applied similarly to the respective configurations of the power supply system 100' shown in FIG. 3 and the power supply system 100" shown in FIG. 4.

As shown in the figure, from a time t0 to a time t1, during which the engine 1 is initially started in response to a start operation implemented by a driver, such as an ignition key operation or a start button operation, for example, the normally closed type lead acid battery path relay 51 is ON, the MOSFET 50 is OFF, and the normally open type lithium ion secondary battery-attached relay 52 is OFF.

Accordingly, power is supplied to the starter 9 from the lead acid battery 15 alone along the path C2. It should be noted that during an initial start, the battery controller 60 may switch the lithium ion secondary battery-attached relay 52 ON so that power is supplied to the starter 9 from the two batteries, i.e. the lead acid battery 15 and the lithium ion secondary battery 16.

From the time t1 to a time t2, i.e. during an operation following completion of the initial engine start, the battery controller 60 switches the lithium ion secondary battery-attached relay 52 ON.

As a result, the power generated by the power generator 2 can be charged to the lithium ion secondary battery 16 along the path C2, as well as to the lead acid battery 15.

Here, it is easier to charge the power generated by the power generator 2 to the lithium ion secondary battery 16 than to the lead acid battery 15, and therefore, if a charging voltage exceeds 13 V when the lead acid battery 15 is fully charged, the lead acid battery 15 is substantially no longer charged. As a result, the power generated by the power generator 2 is charged mainly to the lithium ion secondary battery 16.

At the time t2, at which a deceleration regeneration stage begins prior to an idling stop, the battery controller 60 switches the MOSFET 50 ON. Then, following the elapse of a predetermined time $\Delta t$ after the time $t_2$, the ECM 19 switches the lead acid battery path relay 51 OFF.

By switching the lead acid battery path relay 51 OFF following the elapse of a predetermined time after the MOSFET 50 is switched ON in this manner, the lead acid battery path relay 51 can be switched OFF in a condition where a potential difference between respective ends thereof has decreased, and as a result, an arc can be prevented from occurring when the current is cut off.

The predetermined time $\Delta t$ may be set appropriately at a sufficient time for eliminating, to a certain extent, the potential difference between the respective ends of the lead acid battery path relay 51.

Further, during an idling stop implemented from a time t3 to a time t4 following the end of the deceleration regeneration stage, the lead acid battery path relay 51 is maintained in the OFF condition, and the battery controller 60 maintains the MOSFET 50 and the lithium ion secondary battery-attached relay 52 in the ON condition.

Hence, during the idling stop implemented from the time t3 to the time t4, although the lead acid battery path relay 51 is OFF, electrical conduction between the lithium ion secondary battery 16 and the overall electrical load 30 is secured along the path C1. As a result, power can be supplied to the overall electrical load 30 from both the lead acid battery 15 and the lithium ion secondary battery 16.

It should be noted that, according to one or more embodiments of the present invention, when the power generator 2 cannot be controlled, for example, such that the generated power increases excessively, the battery controller 60 switches the lithium ion secondary battery-attached relay 52 OFF. In so doing, a situation in which an overvoltage is applied to the lithium ion secondary battery 16 is prevented from occurring.

Further, due to characteristics of the lithium ion secondary battery 16 and the lead acid battery 15, power is supplied to the overall electrical load 30 mainly from the lithium ion secondary battery 16. Furthermore, as noted above, it is easier to charge the generated power to the lithium ion secondary battery 16, and therefore the voltage of the lithium ion secondary battery 16 is maintained at or above the voltage of the lead acid battery 15 except during the starting stage of an automatic restart, in which the starter 9 is driven by the power of the lithium ion secondary battery 16, as will be described below.

Incidentally, the lithium ion secondary battery 16 has a higher energy density and a higher charging/discharging energy efficiency than the lead acid battery 15. Moreover, dissolution/precipitation reactions do not occur in electrode material of the lithium ion secondary battery 16 during charging and discharging, meaning that the lithium ion secondary battery 16 has a longer expected lifespan. The lead acid battery 15, meanwhile, has an identical capacity to the lithium ion secondary battery 16 but is lower in cost. On the other hand, an electrode thereof deteriorates in response to discharge, and therefore the lead acid battery 15 is inferior to the lithium ion secondary battery 16 in tell is of durability with respect to repeated charging and discharging.

Hence, in this reference example, during a restart starting stage (a time t4 to a time t5) immediately prior to completion of the idling stop, the battery controller 60 switches the MOSFET 50 OFF.

Accordingly, the lead acid battery path relay 51 and the MOSFET 50 are both OFF, and therefore electrical conduction between the starter 9 side (the lithium ion secondary battery 16) and the overall electrical load 30 side (the lead acid battery 15) is completely cut off. As a result, a momentary drop in the voltage of the overall electrical load 30 caused by a large current flowing through the motor of the starter 9 is prevented. The lithium ion secondary battery-attached relay 52, on the other hand, is maintained in the ON condition, and therefore electrical conduction between the lithium ion secondary battery 16 and the starter 9 is secured so that the starter 9 can be started by discharging the lithium ion secondary battery 16.

A predetermined resistor and a bypass relay connected in parallel thereto may be interposed between the lithium ion secondary battery 16 and the starter 9. With this configuration, by switching the bypass relay from a non-conductive condition to a conductive condition approximately 100 to 150 ms after the starter 9 is driven by power supplied from the lithium ion secondary battery 16, a spike current generated when the starter 9 is started can be greatly reduced so that a favourable starting performance is secured. In this case, control for returning to a normal traveling condition is implemented a predetermined time after the completion of an engine starting operation.

Next, following the end of the restart starting stage, a restart initial stage (the time t5 to a time t6) begins. Here, at the time t5, i.e. at the beginning of the restart initial stage, the battery controller 60 switches the MOSFET 50 ON. The ECM 19, meanwhile, switches the lead acid battery path relay 51 ON a predetermined time ($\Delta t'$ in the figure) after the MOSFET 50 is switched ON.

Hence, the MOSFET 50 is switched ON first, whereupon the lead acid battery path relay 51 is switched ON following the elapse of the predetermined time (a delay) $\Delta t$. Therefore, at the beginning of the restart initial stage (the time t5), the path C1 can be made electrically conductive without delay by the MOSFET 50, which has a higher response speed than the lead acid battery path relay 51, such that power can be discharged to the overall electrical load 30 from both the lead acid battery 15 and the lithium ion secondary battery 16. Furthermore, by switching the MOSFET 50 ON, the potential difference between the respective ends of the lead acid battery path relay 51 is reduced. Therefore, by switching the lead acid battery path relay 51 ON in this condition, an inrush current is prevented from occurring.

During an engine operation (the time t6 to a time t7) following the end of the restart initial stage, the battery controller 60 switches the MOSFET 50 OFF.

Next, at the time t7, an engine stop stage, in which the ignition key is switched OFF, begins. A period from the time t7 to a time t8 corresponds to a stoppage starting stage, which lasts until the engine is stopped. In this reference example, as is evident from the figure, the normally open type lithium ion secondary battery-attached relay 52 is switched OFF at the time t8, at which an engine revolution speed reaches zero. The normally closed type lead acid battery path relay 51, meanwhile, is kept ON. Hence, during the next initial engine start (the time t0), the initial start can be performed in a condition where the lead acid battery 15 and the starter 9 are conductive.

Actions and effects of the above reference example applied to the power supply system 100 will now be described.

In the above reference example, if the power of the lead acid battery 15 is used at the beginning of an automatic restart of the engine 1 (the time t4), deterioration of the lead acid battery 15, which, as noted above, is less durable than the lithium ion secondary battery 16 with respect to repeated charging and discharging, advances every time an idling stop is executed, and as a result, a replacement cycle becomes shorter.

In this reference example, however, the lead acid battery path relay 51 and the MOSFET 50 are switched OFF at the starting stage of an automatic restart of the engine 1 such that a power supply path from the lead acid battery 15 to the starter 9 is cut off. Accordingly, only the power of the lithium ion secondary battery 16 is used during the automatic restart, and therefore the replacement cycle of the lead acid battery 15 can be lengthened.

It should be noted that in FIG. 2, electrical conduction between the lead acid battery 15 and the starter 9 is switched ON and OFF using both the MOSFET 50 and the lead acid battery path relay 51. However, electrical conduction may be switched ON and OFF using either one of the MOSFET 50 and the lead acid battery path relay 51 alone, or using another switch.

When electrical conduction between the lead acid battery 15 and the starter 9 is switched ON and OFF using the MOSFET 50 alone, however, the MOSFET 50 is switched ON and OFF frequently, and as a result, damage may occur due to heat generation. Further, when electrical conduction between the lead acid battery 15 and the starter 9 is switched ON and OFF using the lead acid battery path relay 51 alone, since the responsiveness of the relay switch is low, the automatic restart takes time if the lead acid battery path relay 51 is controlled to the OFF condition after the automatic restart condition is established. If, on the other hand, the lead acid battery path relay 51 is switched to the OFF condition during the idling stop, since the MOSFET 50 is also switched OFF, power can no longer be supplied from the lithium ion secondary battery 16 during the idling stop.

Moreover, from the viewpoint of improving component safety and reliability, according to one or more embodiments of the present invention, a redundant circuit including both the MOSFET 50 and the lead acid battery path relay 51 are formed rather than switching electrical conduction between the lead acid battery 15 and the starter 9 ON and OFF using either the MOSFET 50 or the lead acid battery path relay 51 alone.

In this reference example, the lead acid battery path relay 51 and the MOSFET 50 are switched OFF and ON, respectively, during the idling stop (the time t3 to the time t4), and at the start of the automatic restart (the time t4), the highly responsive MOSFET 50 is switched from the ON condition to the OFF condition. In so doing, the power supply path from the lead acid battery 15 to the starter 9 can be cut off reliably, and as a result, the automatic restart can be executed quickly without causing a voltage drop to occur in the overall electrical load 30.

In this reference example in particular, the voltage of the lithium ion secondary battery 16 takes a value that equals or exceeds the voltage of the lead acid battery 15 at all times except for the restart starting stage (the time t4 to the time t5). Put in opposite terms, the voltage of the lead acid battery 15 exceeds the voltage of the lithium ion secondary battery 16, such that a current can flow from the lead acid battery 15 side to the lithium ion secondary battery 16 side, only during the restart starting stage (the time t4 to the time t5). Therefore, by switching the lead acid battery path relay 51 and the MOSFET 50 OFF during the restart starting stage (the time t4 to the time t5), a current can be prevented from flowing from the lead acid battery 15 side to the lithium ion secondary battery 16 side.

Hence, a current can be prevented from flowing from the lead acid battery 15 side to the lithium ion secondary battery 16 side without disposing a MOSFET having a parasitic diode with a forward direction that is oriented in an opposite direction to the forward direction of a parasitic diode of the MOSFET 50. As a result, the number of used MOSFETs can be reduced, enabling a reduction in cost.

As regards a part connecting the lead acid battery 15 to the overall electrical load 30, the power supply system 100 according to this reference example is configured similarly to an electrical circuit of a typical vehicle including only one battery.

Furthermore, in this reference example, as described above, only the lithium ion secondary battery 16 is used during an automatic restart, while the lead acid battery 15 is not used. Hence, even when the power supply system 100 according to this reference example is installed in a vehicle having an idling stop function, there is no need to increase the capacity of the lead acid battery 15, and therefore the lead acid battery 15 can be formed to identical specifications to a lead acid battery provided in a vehicle not having an idling stop function. As a result, the cost of installing an idling stop system in the vehicle can be reduced.

Moreover, according to this reference example, even when a negative terminal of the lithium ion secondary battery 16 becomes detached or the like, for example, such that power cannot be supplied from the lithium ion secondary battery 16 to the starter 9, power can be supplied to the starter 9 from the lead acid battery 15 by closing the lead acid battery path relay 51, thereby enabling an automatic restart. In other words, redundancy is realized in the automatic restart system.

It should be noted that in this reference example, the lithium ion secondary battery pack P includes the lithium ion secondary battery 16, the MOSFET 50, the lithium ion secondary battery-attached relay 52, and the battery controller 60, whereas the lead acid battery path relay 51 is disposed outside the lithium ion secondary battery pack P.

However, this configuration may be modified as desired, as long as the actions realized by the circuits of the power supply system 100 do not vary. For example, the lead acid battery path relay 51 may be disposed in the lithium battery pack P while remaining parallel to the MOSFET 50. Further, the battery controller 60 may be provided outside the lithium ion secondary battery pack P.

First Embodiment

A first embodiment will now be described. It should be noted that in the respective embodiments described below, identical reference numerals have been allocated to similar elements to those of the above reference example, and description thereof has been omitted. Moreover, it is assumed that the power supply system 100 having the configuration shown in FIG. 2 is used in the control according to this embodiment.

Figure 5:
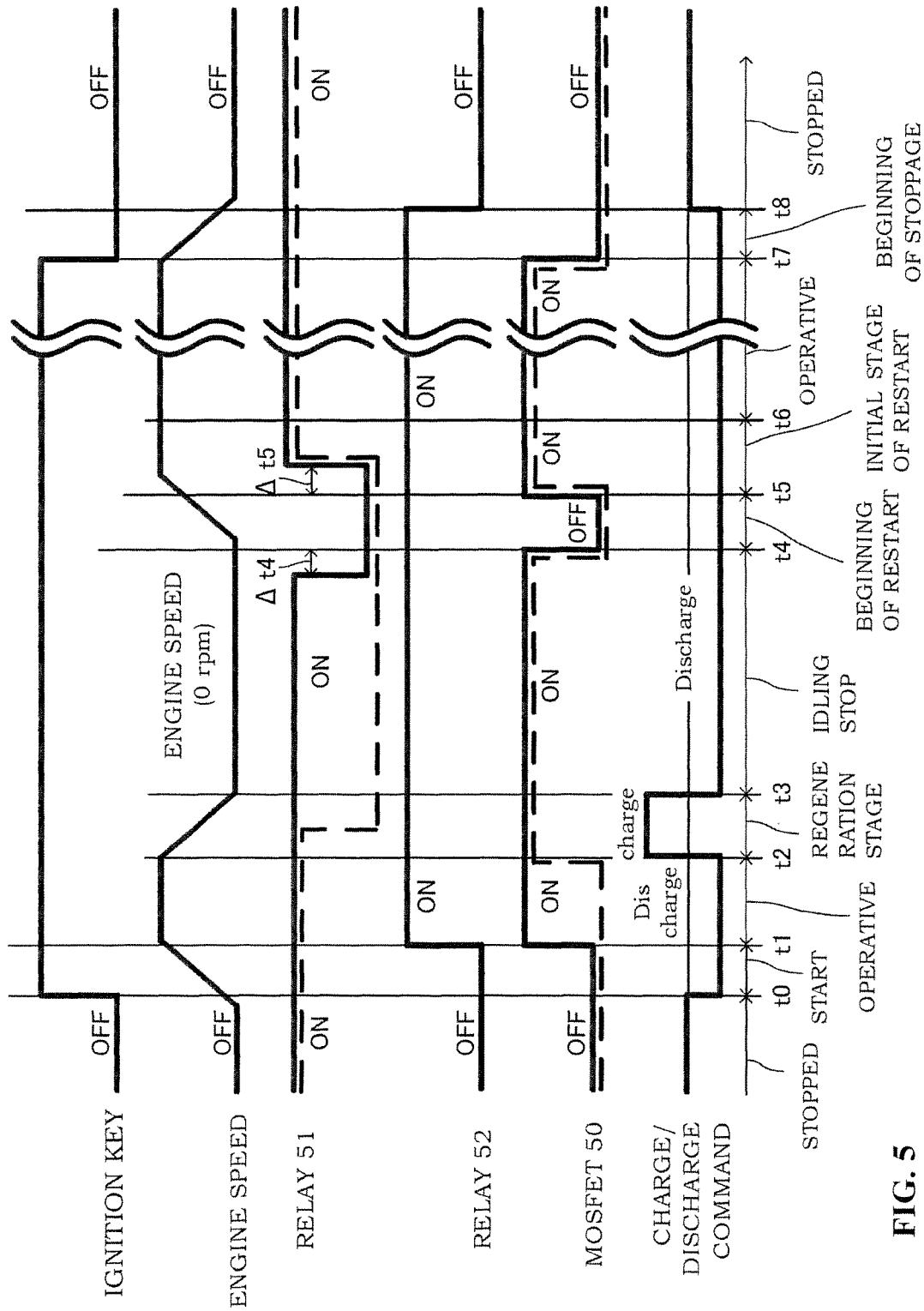
FIG. 5 is a time chart illustrating switching control according to a first embodiment.

FIG. 5 is a time chart illustrating switching control implemented on the lead acid battery path relay 51, the lithium ion secondary battery-attached relay 52, and the MOSFET 50 according to this embodiment. For reference, the ON/OFF control chart of the reference example shown in FIG. 8 is shown by dotted lines in the figure in relation to the lead acid battery path relay 51 and the MOSFET 50.

The figure also shows a charge/discharge command chart. The charge/discharge command chart shows a positive value only during deceleration regeneration, i.e. from the time t2 to the time t3. Accordingly, from the time t2 to the time t3, a charge command is issued to charge the lead acid battery 15 and the lithium ion secondary battery 16.

Other than during deceleration regeneration (the time t2 to the time t3), on the other hand, a discharge command is issued to discharge the lead acid battery 15 and the lithium ion secondary battery 16. In this embodiment in particular, as will be described in detail below, a discharge amount ratio of the lead acid battery 15 and the lithium ion secondary battery 16 can be adjusted favorably while the discharge command is issued.

In the control according to this embodiment, when the engine 1 enters the operation condition (the time t1) following an initial start, the battery controller 60 switches the MOSFET 50 from the OFF condition to the ON condition.

Further, in the control of the power supply system 100 according to this embodiment, the lead acid battery path relay 51 is maintained in the ON condition up to a predetermined time Δt4 prior to the time t4 at which the idling stop is terminated. At the predetermined time Δt4 prior to the time t4, the ECM 19 switches the lead acid battery path relay 51 to the OFF condition. The restart starting stage is then terminated and the restart initial stage begins (the time t5). Then, following the elapse of a predetermined time Δt5, the ECM 19 switches the lead acid battery path relay 51 back ON.

In other words, in this embodiment, following the initial start of the engine 1, the lead acid battery path relay 51 and the MOSFET 50 are maintained in the ON condition at all times except during the restart starting stage (the time t4 to the time t5) and for a predetermined time before and after the restart starting stage.

According to this embodiment, therefore, discharge is performed from the lithium ion secondary battery 16 to the overall electrical load 30 on the lead acid battery 15 side along both the path C1 and the path C2 over the entire period in which the discharge command is issued, except for the restart starting stage (the time t4 to the time t5) and a predetermined time before and after the restart starting stage.

In comparison with a case where only one path is used to perform discharge from the lithium ion secondary battery 16 to the overall electrical load 30, therefore, harness resistance can be reduced, enabling an increase in the discharge amount from the lithium ion secondary battery 16 to the overall electrical load 30, and as a result, the discharge amount from the lead acid battery 15 to the overall electrical load 30 can be suppressed.

When the control according to the embodiment described above is applied to the power supply system 100, one or more of the following actions and effects may be obtained.

The power supply system 100 employing the control according to this embodiment is applied to a vehicle having an idling stop function for executing an automatic stop and an automatic restart on an engine. The power supply system 100 includes the power generator 2, the lead acid battery 15 that can be charged with and can discharge the power generated by the power generator 2, the lithium ion secondary battery 16 that can be charged with and can discharge the generated power, the two paths C1, C2 connecting the lead acid battery 15 and the lithium ion secondary battery 16, the engine restarting unit 9 connected to either the lead acid battery 15 or the lithium ion secondary battery 16 in order to start the engine 1 at the start of an automatic restart, the electrical load 30 of the vehicle, which is connected to the lead acid battery 15, the lead acid battery path relay 51 for switching the path C2 between the conductive condition and the non-conductive condition, the MOSFET 50 for switching the other path C1 between the conductive condition and the non-conductive condition, and the ECM 19 and the battery controller 60 for implementing ON/OFF control on the lead acid battery path relay 51 and the MOSFET 50. The control unit 19, 60 switches both the lead acid battery path relay 51 and the MOSFET 50 to the conductive condition while the engine 1 is operative, except during the starting stage of the automatic restart following an idling stop, and during an idling stop. It should be noted that here, "the starting stage of the automatic restart" is assumed to include the time zone extending from the predetermined time Δt4 before the time t4 to the predetermined time Δt5 after the time t5, in addition to the period extending from the time t4 to the time t5, which serves as the restart starting stage shown in FIG. 5 and described above. In other words, "the starting stage of the automatic restart" refers to a time zone extending from a time t4−Δt4 to a time t5+Δt5 in FIG. 5.

In the power supply system 100 to which the control according to this embodiment is applied, from the initial start of the engine 1 onward, or in other words from the time t0 onward, the MOSFET 50 and the lead acid battery path relay 51 are maintained in the conductive condition at all times except for the starting stage of the automatic restart (the time t4−Δt4 to the time t5+Δt5). Accordingly, the two paths C1, C2 extending from the lithium ion secondary battery 16 serving as the second storage unit to the lead acid battery 15 serving as the first storage unit are both conductive.

Hence, during discharge, power is supplied from the lithium ion secondary battery 16 to the overall electrical load 30 on the lead acid battery 15 side using both the path C1 and the path C2, and therefore harness resistance from the lithium ion secondary battery 16 to the overall electrical load 30 can be reduced in comparison with a case where only one path is used during discharge from the lithium ion secondary battery 16 to the overall electrical load 30. As a result, the discharge amount from the lithium ion secondary battery 16 to the overall electrical load 30 can be increased, and the discharge amount of the lead acid battery 15 can be suppressed.

It was found, as a result of committed research undertaken by the present inventors, that with the power supply system 100 to which the control according to this embodiment is applied, a discharge share ratio of the lead acid battery 15 is reduced by approximately 8% in comparison with the control of the reference example described above.

It should be noted that the control according to this embodiment is not limited to the type 1 power supply system 100 shown in FIG. 2, and may also be applied to the type 2 power supply system 100' shown in FIG. 3 or the type 3 power supply system 100" shown in FIG. 4.

Second Embodiment

A second embodiment will now be described. Identical reference numerals have been allocated to similar elements to those of the first embodiment, and description thereof has been omitted. It is assumed that the power supply system 100" having the configuration shown in FIG. 4 is used in the control according to this embodiment.

Figure 6:
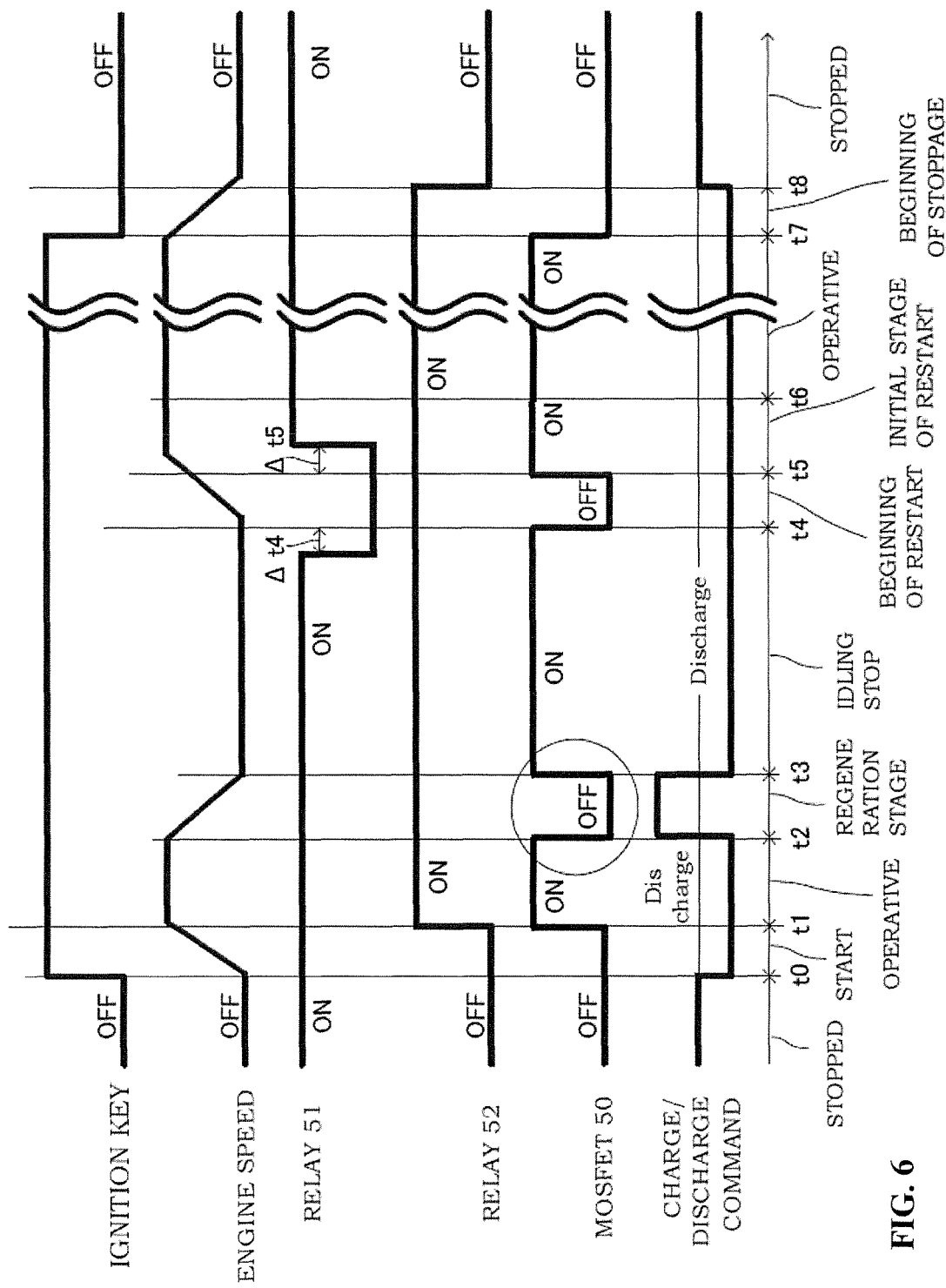
FIG. 6 is a time chart illustrating switching control according to a second embodiment.

FIG. 6 is a time chart illustrating switching control implemented on the lead acid battery path relay 51, the lithium ion secondary battery-attached relay 52, and the MOSFET 50 according to this embodiment. This embodiment differs from the control according to the first embodiment, shown in FIG. 5, in that during the deceleration regeneration stage (the time t2 to the time t3), in which the charge command is issued, the battery controller 60 switches the MOSFET 50 OFF (see the encircled part of the figure).

When the control according to this embodiment is applied to the power supply system 100", one or more of the following actions and effects may be obtained.

In the power supply system 100" employing the control according to this embodiment, the battery controller 60 switches the MOSFET 50, which serves as a second switch, to the non-conductive condition when deceleration regeneration is underway in the automobile. Hence, during deceleration regeneration, or in other words when the charge command is issued, the path C1 is non-conductive, and therefore only the path C2 extends from the power generator 2 to the lithium ion secondary battery 16.

Accordingly, harness resistance from the power generator 2 to the lithium ion secondary battery 16 increases in comparison with a case where the path C1 and the path C2 can both be used, and therefore a charging amount charged to the lithium ion secondary battery 16 is suppressed, leading to an inevitable increase in the charging amount charged to the lead acid battery 15. In other words, a charging share ratio of the lead acid battery 15 can be increased during charging, and as a result, a state of charge (SOC) of the lead acid battery 15 can be increased.

It should be noted that the control according to this embodiment is not limited to the type 3 power supply system 100" shown in FIG. 4, and may also be applied to the type 1 power supply system 100 shown in FIG. 2 or the type 3 power supply system 100' shown in FIG. 3.

Third Embodiment

A third embodiment will now be described. Identical reference numerals have been allocated to similar elements to those of the first embodiment, and description thereof has been omitted. It is assumed that the power supply system 100' having the configuration shown in FIG. 3 is used in the control according to this embodiment. A particularly important part of this embodiment is that the motor 70 functioning as a power generator is disposed on the side of the lithium ion secondary battery 16 serving as the second storage unit.

Figure 7:
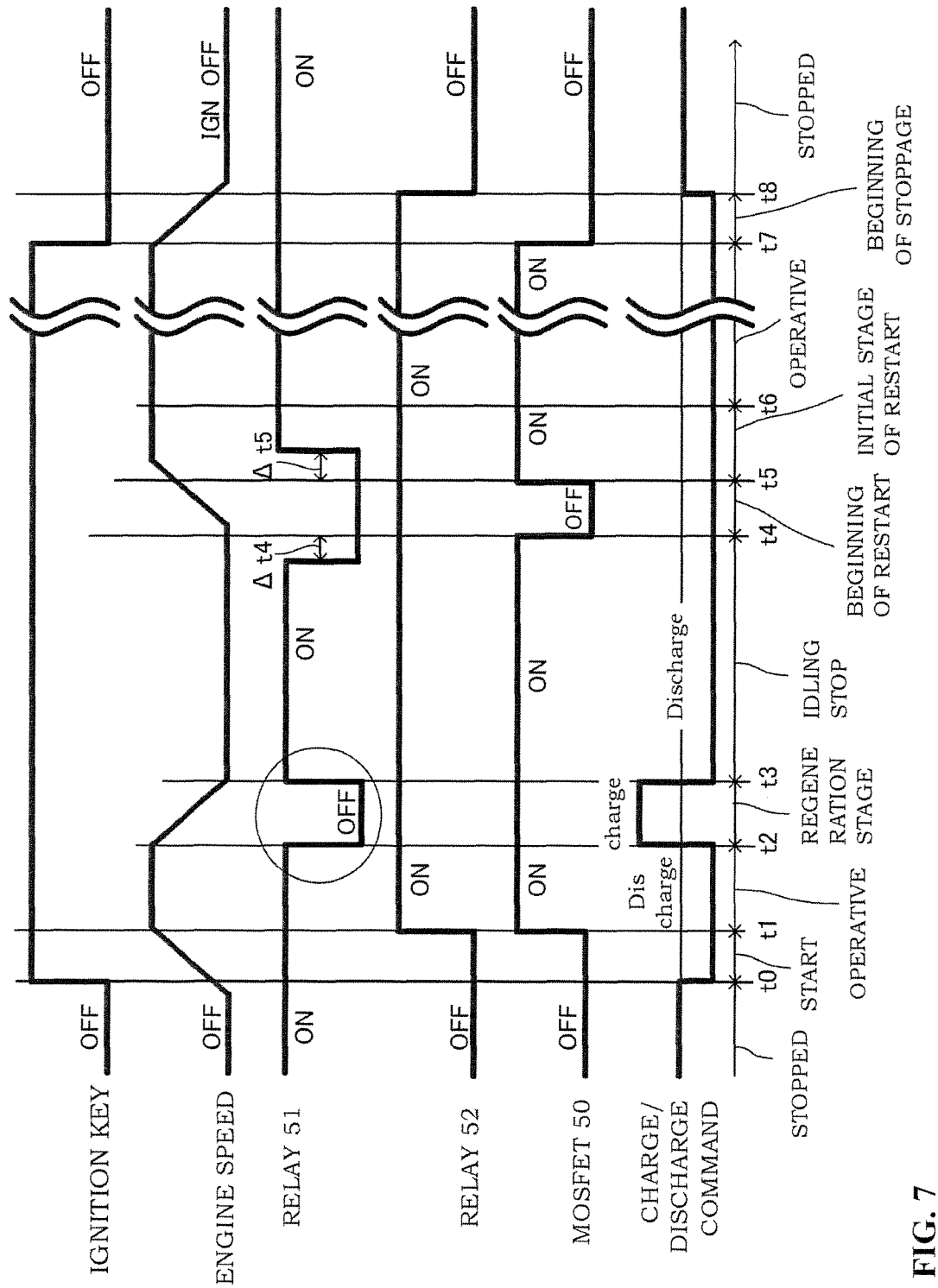
FIG. 7 is a time chart illustrating switching control according to a third embodiment.

FIG. 7 is a time chart illustrating switching control implemented on the lead acid battery path relay 51, the lithium ion secondary battery-attached relay 52, and the MOSFET 50 according to this embodiment. This embodiment differs from the first embodiment shown in FIG. 5 in that during the deceleration regeneration stage (the time t2 to the time t3), when the charge command is issued, the lead acid battery path relay 51 is switched OFF (see the encircled part of the figure).

When the control according to this embodiment is applied to the power supply system 100, one or more of the following actions and effects may be obtained.

In the power supply system 100 employing the control according to this embodiment, the motor 70 serving as a power generator is disposed on the lithium ion secondary battery 16 side. Further, the battery controller 60 switches the lead acid battery path relay 51 to the non-conductive condition when deceleration regeneration is underway in the automobile. Hence, during deceleration regeneration (the time t2 to the time t3), when the charge command is issued, the path C2 is non-conductive, and therefore the path C1 must be used to connect the motor 70 to the lead acid battery 15 serving as the first storage unit. Accordingly, the generated power passes through the lithium ion secondary battery 16 serving as the second storage unit when traveling from the motor 70 to the lead acid battery 15, whereby the power of the motor 70 is charged preferentially to the lithium ion secondary battery 16. Hence, the charging share ratio of the lithium ion secondary battery 16 can be increased, and as a result, the state of charge (SOC) of the lithium ion secondary battery 16 can be increased.

Furthermore, in the power supply system 100 according to this embodiment, as described above, the generated power is charged preferentially to the lithium ion secondary battery 16 while traveling from the motor 70 to the lead acid battery 15, and therefore the voltage actually supplied to the lead acid battery 15 drops, thereby preventing the voltage charged to the lead acid battery 15 from becoming excessive. In this embodiment in particular, the power supplied to the overall electrical load 30, which is disposed on the lead acid battery 15 side, can also be suppressed, and therefore a situation in which an overvoltage is applied to the overall electrical equipment load 30 can be reliably prevented from occurring.

It should be noted that the control according to this embodiment is not limited to the type 2 power supply system 100' shown in FIG. 3, and may also be applied to the type 2 power supply system 100 shown in FIG. 2.

Embodiments of the present invention were described above, but the above embodiments merely illustrate some example applications of the present invention, and the technical scope of the present invention is not limited to the specific configurations of the above embodiments. For example, the first storage unit is not limited to the lead acid battery 15, and a lead-free secondary battery such as a nickel hydrogen battery, for example, may be used instead. Further, switching elements employing semiconductors may be used instead of the mechanical relays used in the embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A power supply system in a vehicle having an idling stop function for executing an automatic stop and an automatic restart on an engine, the power supply system comprising:
    a power generator;
    a first storage unit that can be charged with and can discharge generated power generated by the power generator;
    a second storage unit that can be charged with and can discharge the generated power;
    two paths connecting the first storage unit and the second storage unit;
    a switching unit including a first switch for switching one path of the two paths between a conductive condition and a non-conductive condition, and a second switch for switching another path of the two paths between a conductive condition and a non-conductive condition;
    an engine restarter connected to either the first storage unit side or the second storage unit side of the switching unit in order to start the engine during the automatic restart;
    an electrical load of the vehicle, which is connected to the first storage unit side of the switching unit; and
    a controller configured to implement ON/OFF control on the first switch and the second switch,
    wherein the controller switches both the first switch and the second switch to the conductive condition for an entirety of a first period during which the engine is stopped during the idling stop, and for an entirety of a second period during which the engine is operative except during for a starting stage of the automatic restart, whereby discharge from the second storage unit to the electrical load is performed using both of the two paths.

2. A power supply system in a vehicle having an idling stop function for executing an automatic stop and an automatic restart on an engine, the power supply system comprising:
    a power generator;
    a first storage unit that can be charged with and can discharge generated power generated by the power generator;
    a second storage unit that can be charged with and can discharge the generated power;
    two paths connecting the first storage unit and the second storage unit;

a switching unit including a first switch for switching one path of the two paths between a conductive condition and a non-conductive condition, and a second switch for switching another path of the two paths between a conductive condition and a non-conductive condition;

an engine restarter connected to either the first storage unit side or the second storage unit side of the switching unit in order to start the engine during the automatic restart;

an electrical load of the vehicle, which is connected to the first storage unit side of the switching unit; and a controller configured to implement ON/OFF control on the first switch and the second switch, wherein the controller switches the second switch to the non-conductive condition when deceleration regeneration is underway in the vehicle, and wherein the controller switches both the first switch and the second switch to the conductive condition for an entirety of a first period during which the engine is stopped during the idling stop, and for an entirety of a second period during the engine is operative except for both a starting stage of the automatic restart and the deceleration regeneration, whereby discharge from the second storage unit to the electrical load is performed using both of the two paths.

3. A power supply system in a vehicle having an idling stop function for executing an automatic stop and an automatic restart on an engine, the power supply system comprising:

a power generator;

a first storage unit that can be charged with and can discharge generated power generated by the power generator;

a second storage unit that can be charged with and can discharge the generated power, two paths connecting the first storage unit and the second storage unit;

a switching unit including a first switch for switching one path of the two paths between a conductive condition and a non-conductive condition, and a second switch for switching another path of the two paths between a conductive condition and a non-conductive condition;

an engine restarter connected to either the first storage unit side or the second storage unit side of the switching unit in order to start the engine during the automatic restart;

an electrical load of the vehicle, which is connected to the first storage unit side of the switching unit; and a controller configured to implement ON/OFF control on the first switch and the second switch, wherein the power generator is disposed on the second storage unit side of the switching unit, wherein the controller switches the first switch to the non-conductive condition when deceleration regeneration is underway in the vehicle, and wherein the controller switches both the first switch and the second switch to the conductive condition for an entirety of a first period during which the engine is stopped during the idling stop, and for entirety of a second period during which the engine is operative except for both a starting stage of the automatic restart and the deceleration regeneration, whereby discharge from the second storage unit to the electrical load is performed using both of the two paths.

* * * * *